(12) United States Patent
Winston et al.

(10) Patent No.: US 9,926,848 B2
(45) Date of Patent: Mar. 27, 2018

(54) TURBOMACHINE FUEL DELIVERY METHOD AND ASSEMBLY

(75) Inventors: Kenneth W. Winston, San Diego, CA (US); Andre M. Ajami, Spring Valley, CA (US); David Lloyd Ripley, San Diego, CA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 2212 days.

(21) Appl. No.: 12/985,672

(22) Filed: Jan. 6, 2011

(65) Prior Publication Data
US 2012/0174594 A1   Jul. 12, 2012

(51) Int. Cl.
*F02C 7/22* (2006.01)
*F02C 7/26* (2006.01)
*F01D 19/00* (2006.01)

(52) U.S. Cl.
CPC ............... *F02C 7/26* (2013.01); *F01D 19/00* (2013.01); *F02C 7/22* (2013.01); *F05D 2270/021* (2013.01)

(58) Field of Classification Search
CPC ............... F02C 7/22; F02C 7/26; F02C 7/266
USPC .................................. 60/776, 778, 786–790
See application file for complete search history.

(56) References Cited

U.S. PATENT DOCUMENTS

| | | | |
|---|---|---|---|
| 5,274,996 A | 1/1994 | Goff et al. | |
| 5,303,541 A | 4/1994 | Goff et al. | |
| 5,907,949 A * | 6/1999 | Falke et al. | 60/779 |
| 6,105,370 A | 8/2000 | Weber | |
| 6,316,841 B1 | 11/2001 | Weber | |
| 6,829,899 B2 | 12/2004 | Benham, Jr. et al. | |
| 6,836,086 B1 | 12/2004 | Goldberg et al. | |
| 6,941,760 B1 | 9/2005 | Jones | |
| 6,988,368 B2 * | 1/2006 | O'Connor | 60/778 |
| 7,000,405 B2 * | 2/2006 | McKelvey et al. | 60/786 |
| 7,095,601 B2 | 8/2006 | Mehrer et al. | |
| 7,168,254 B2 | 1/2007 | Riley | |
| 7,331,169 B2 | 2/2008 | Riley | |
| 7,340,901 B2 | 3/2008 | Riley | |
| 2006/0254282 A1 | 11/2006 | Riley | |
| 2009/0077973 A1 * | 3/2009 | Hu et al. | 60/741 |

* cited by examiner

*Primary Examiner* — Arun Goyal
(74) *Attorney, Agent, or Firm* — Carlson, Gaskey & Olds, P.C.

(57) ABSTRACT

An example method of fuel delivery to a turbomachine includes reaching a light-off speed of a turbomachine and delivering fuel to a combustor of the turbomachine at a first rate. The method also increases the rate of the delivery. The combustor achieves light-off at a fuel flow rate on or in-between the first rate and a second rate that is greater than the first rate. An example turbomachine fuel delivery assembly includes a fuel delivery component and a controller configured to adjust the fuel pump to increase a rate of fuel delivery from a fuel supply to a combustor of a turbomachine.

7 Claims, 3 Drawing Sheets

# TURBOMACHINE FUEL DELIVERY METHOD AND ASSEMBLY

BACKGROUND

This disclosure relates generally to light-off of a turbomachine combustor and, more particularly, to increasing fuel delivery to a turbomachine combustor until achieving light-off.

Turbomachines transfer energy from a rotor to a fluid as is known. During operation, air is pulled into the turbomachine. In a gas turbine machine the air is then compressed, mixed with fuel and combusted. The products of combustion expand to rotatably drive a turbine section of the turbomachine.

A fuel system delivers fuel to a combustor of the turbomachine during a typical startup. An igniter is then activated to light the fuel. Light-off is the point at which the delivered fuel ignites. To achieve light-off, the fuel must be delivered to the combustor at the appropriate rate. Many fuel systems include complex and costly arrangements of pressure sensors and metering valves to ensure that the fuel system delivers fuel to the combustor at rate appropriate to achieve light-off. These components attempt to compensate, for example, for differences between a desired fuel delivery rate and an actual fuel delivery rate. Differences may occur due to production tolerances, fuel types, temperatures, altitude conditions, etc.

One example turbomachine is an auxiliary power unit (APU). A typical APU is located in the tail section of a large aircraft. The APU typically provides power (electrical, hydraulic, or shaft), and compressed air to the aircraft.

SUMMARY

An example method of fuel delivery to a turbomachine includes reaching a light-off speed of a turbomachine and delivering fuel to a combustor of the turbomachine at a first rate. The method also increases the rate of the delivery. The combustor achieves light-off at a fuel flow rate on or in-between the first rate and a second rate that is greater than the first rate.

An example turbomachine fuel delivery assembly includes a fuel delivery component and a controller configured to adjust the fuel pump to increase a rate of fuel delivery from a fuel supply to a combustor of a turbomachine.

An example auxiliary power unit for an aircraft includes a fuel supply, a combustor, and a fuel delivery component capable of varying fuel flow between an initial fuel setting and a second fuel setting. The fuel delivery component is configured to deliver less fuel flow to the combustor when in the initial setting than when in the second setting. A controller initiates movement of the fuel delivery component from the first setting to the second setting during a start up of the auxiliary power unit. The fuel delivery component may be commanded anywhere between the initial setting and the second setting when the combustor achieves light-off.

These and other features of the disclosed examples can be best understood from the following specification and drawings, the following of which is a brief description.

DETAILED DESCRIPTION

Figure 1:
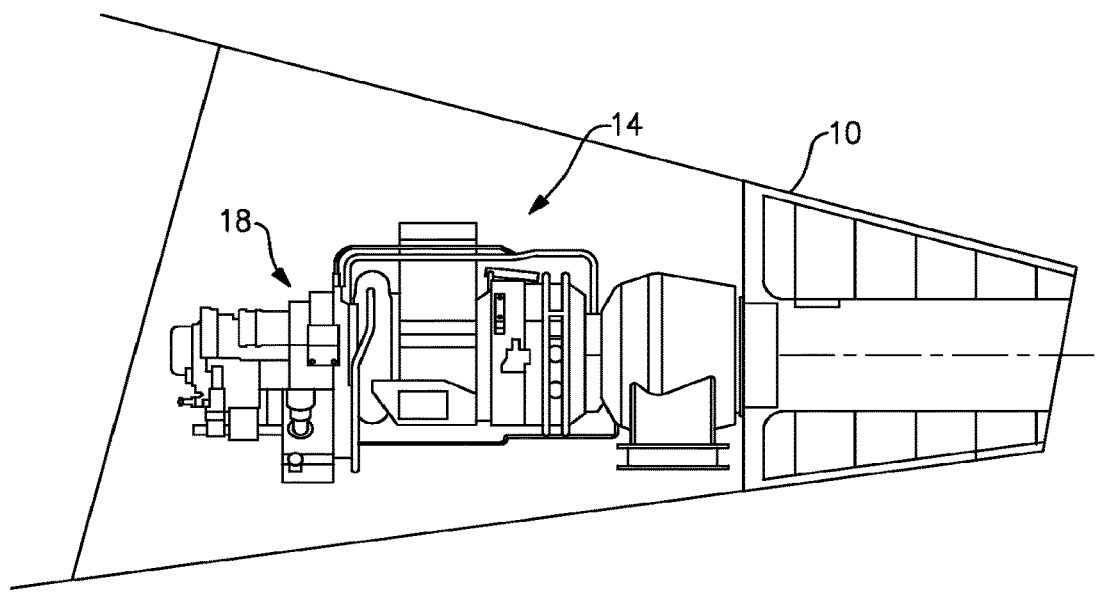
FIG. 1 shows a side view of an auxiliary power unit within a tail section of an aircraft.

Referring to FIG. 1, a tail section 10 of an example aircraft houses an auxiliary power unit (APU) 14. As known, the APU 14 is used to provide power and pressurized air for use in the aircraft.

The APU 14 includes a combustor 18. Fuel is delivered to the combustor 18 during operation of the APU 14. As known, during startup of the APU 14, fuel must be delivered to the combustor 18 at a sufficient rate or the combustor 18 will not achieve light-off. Delivering too much fuel to the combustor 18 may undesirably waste fuel or flood the combustor 18.

Figure 2:
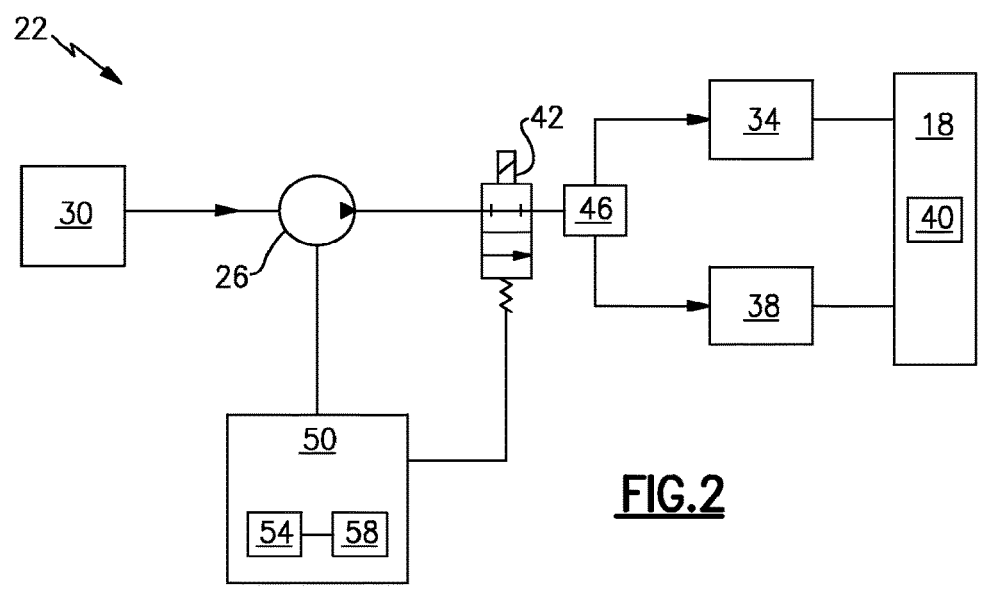
FIG. 2 shows a schematic view of an example fuel delivery system that delivers fuel to a combustor of the FIG. 1 auxiliary power unit.
Figure 3:
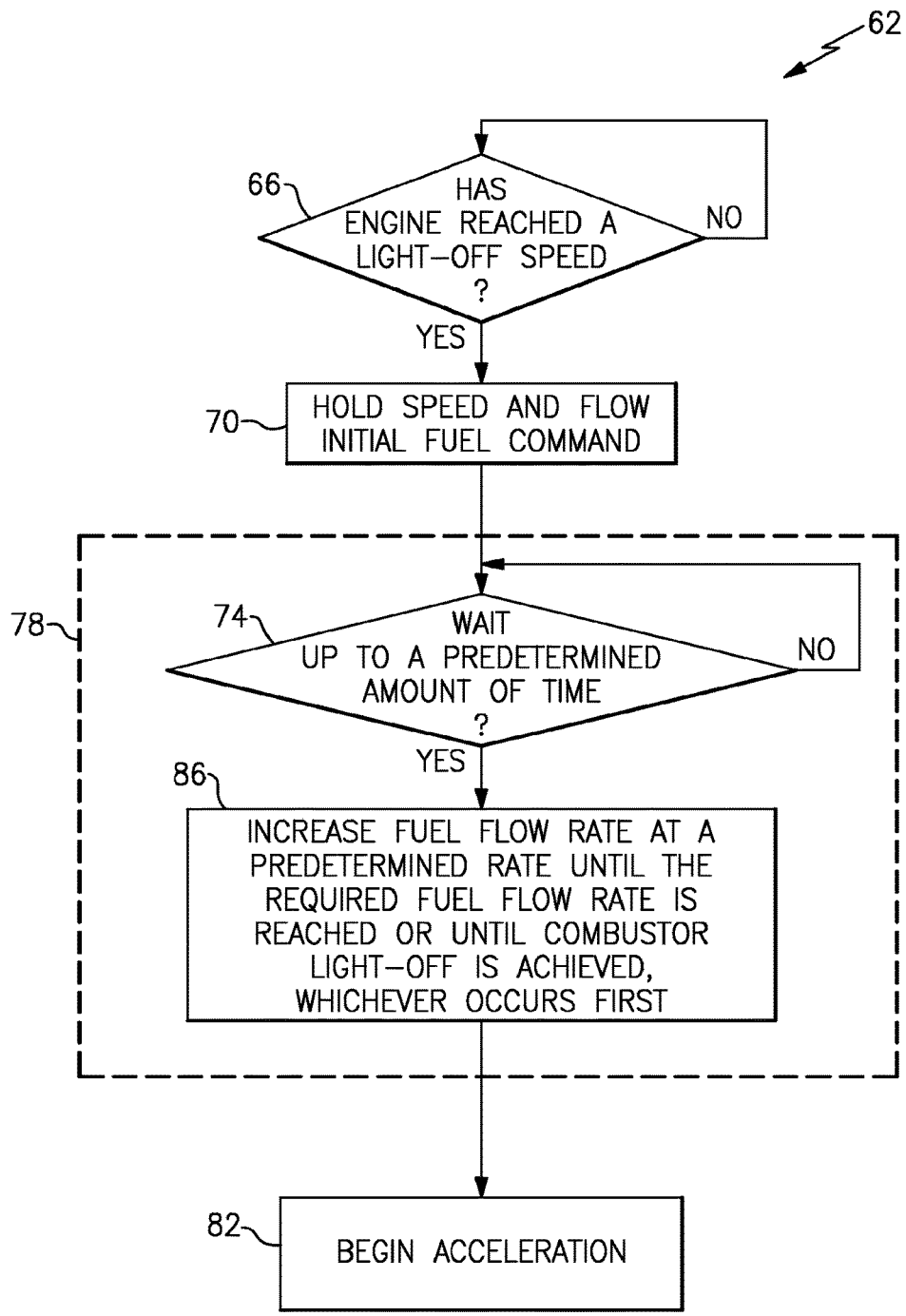
FIG. 3 shows an example method of fuel delivery used by the FIG. 2 fuel delivery system.
Figure 4:
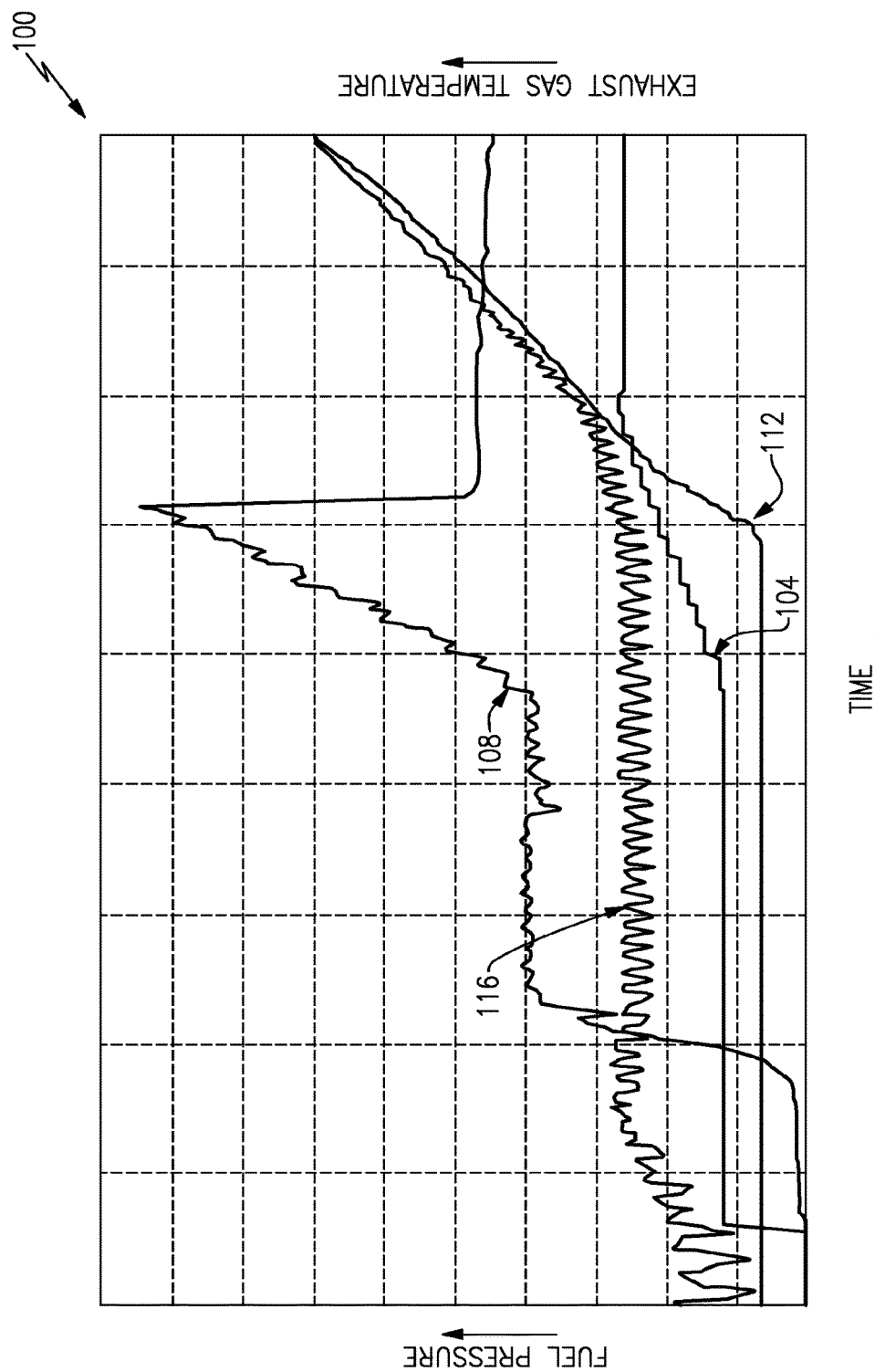
FIG. 4 is a graphic representation of the FIG. 3 method.

Referring to FIG. 2-4 with continuing reference to FIG. 1, an example fuel delivery system 22 delivers (or sprays) fuel into the combustor 18. The fuel delivery system 22 includes a variable speed motor driven fuel pump 26 that delivers fuel from a fuel supply 30 to a plurality of primary fuel injectors 34 and a plurality of main fuel injectors 38. The fuel pump 26 is a type of variable component. That is, the fuel pump 26 includes components that can be selectively moved (or varied) between positions that provide more fuel and positions that provide less fuel.

Both the primary fuel injectors 34 and the main fuel injectors 38 spray fuel directly into the combustor 18. When fuel is delivered from the primary fuel injectors 34 and the main fuel injectors 38 at an appropriate rate, an igniter 40 within the combustor 18 will ignite the fuel causing the combustor 18 to light-off.

The fuel delivery system 22 also includes a solenoid 42 and a flow divider valve 46 coupled to an engine controller 50. The example controller 50 is a FADEC (Full Authority Digital Electronic Control) controller that is configured to vary a flow command to the fuel delivery system 22 by adjusting components of the fuel pump 26. A person having skill in this art and the benefit of this disclosure would understand how to adjust flow from the fuel pump 26 using the controller 50. The flow divider valve 46 (a type of pressure relief valve) prevents over-pressurizing of the primary fuel injectors.

The controller 50 is also able to stop flow through the fuel delivery system 22, regardless the positioning of the fuel pump 26, by actuating the solenoid 42.

In this example, the controller 50 includes a memory portion 54 and a CPU 58. The CPU 58 is configured to execute a program stored in the memory portion 54. The example memory portion 54 stores a program such as a method 62 that is executed during startup of the APU 14.

Referring to the method 62, a step 66 determines if the APU 14 has reached a light-off speed. In this example, the light-off speed is 8 percent of the rated rotor speed. A motor portion 68 of the APU 14 may be used to accelerate and maintain the APU 14 at such a speed. Maintaining the APU 14 at 8 percent rotor speed ensures that an adequate amount of air is moving through the APU 14 during the startup. Other examples may maintain the speed in other ways.

At a step 70, the method 62 initializes fuel delivery at a first rate. In this example, the controller 50 initializes the fuel command by commanding the fuel pump 26 at to deliver fuel at a commanded rate, say 30 lb/hr (13.61 kg/hr). The example commanded rate is a low potential delivery rate through the fuel pump 26. Making the initial commanded rate a low potential delivery rate ensures that light-off can be achieved, even if the fuel pump 26 delivers fuel at an actual rate that is much higher than the commanded rate.

For example, the fuel pump 26 may deliver fuel at an actual rate that varies +/−15 lb/hr (6.80 kg/hr) from the commanded rate. If the fuel pump 26 is on the high end of this tolerance band, a commanded rate of 30 lb/hr (13.61 kg/hr) may result in an actual rate of 45 lb/hr, and a commanded rate of 45 lb/hr (20.41 kg/hr) may result in an actual rate of 60 lb/hr (27.22 kg/hr), etc. The actual delivery of fuel from the fuel pump 26 varies due to production tolerances, fuel types, differential pressure across the fuel pump 26, and fuel temperatures, for example.

In such an example, if the combustor 18 achieves light-off when fuel is delivered at an optimum rate of 45 lb/hr (20.41 kg/hr) to the combustor 18, setting the commanded rate at 45 lb/hr (20.41 kg/hr) may not result in light-off because the fuel pump 26 would be delivering fuel to the combustor 18 at an actual rate of 60 lb/hr (27.22 kg/hr).

After the step 70, the example method 62 waits a predetermined amount of time, say 4 seconds, at a step 74. The method 62 also determines if light-off has taken place. This determination is represented by box 78. If the combustor 18 achieves light-off, the method 62 begins accelerating the engine at a step 82 to more than 8 percent.

In this example, increases in the temperature of the exhaust gas leaving the APU 14 are monitored to determine whether the combustor 18 achieves light-off. A thermocouple is mounted to the exhaust to determine increases in the temperature of the exhaust gas, for example.

If the combustor 18 does not achieve light-off after 4 seconds at the initial fuel setting, the method 62 increases the commanded rate at a step 86. The commanded rate is ramped at a rate that is between 10-25 lb/hr/sec. (4.54-11.34 kg/hr/sec), for example. The method 62 ramps up the rate for about 5 seconds at the step 74. If light-off has not taken place, the method 62 may hold the commanded rate at about 135 pph for another 4 seconds or so.

The combustor 18 will likely eventually achieve light-off provided the fuel pump 26 is capable of delivering fuel at the required level. If not, the start is aborted.

A graph 100 shows the beginning of the increase in fuel flow rate represented by the ramp up in the fuel pump command at 104. The ramp up in the command at 104 corresponds to a higher fuel pressure at 108. The fuel pressure continues to increase due to the increases in fuel flow rates from the controller 50 until light-off is achieved at 112. The speed of the APU 14 is represented by line 116. In this example, the speed is maintained during the ramp up.

Features of the disclosed examples include varying a fuel pump command from delivering a low rate of fuel to delivering a high rate of fuel to ensure that a correct fuel flow is provided at some point to the combustor such that combustor light-off can be achieved. The correct fuel flow is provided without providing too much fuel to the combustor. Too much fuel can flood the combustor. Another feature of the disclosed examples includes using a relatively simple system for fuel delivery when compared to prior art fuel delivery systems.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of fuel delivery to a turbomachine, comprising:
   reaching a light-off speed of a turbomachine;
   delivering fuel to a combustor of the turbomachine at a first rate;
   increasing a rate of the delivering, wherein the combustor achieves light-off at a fuel flow rate on or in-between the first rate and a second rate that is greater than the first rate, wherein the first rate corresponds to a lowest fuel flow command that could produce a combustor light-off and the second rate corresponding to a highest fuel flow command that could produce a combustor light-off;
   adjusting fuel delivery components to provide fuel to the combustor at the first rate and then increasing the rate to achieve light-off without exceeding the second rate; and
   increasing the rate of the delivering by between 10-25 lb/hr/sec.

2. The method of claim 1, including monitoring exhaust gas from the turbomachine to determine if the combustor has achieved light-off.

3. The method of claim 1, wherein the turbomachine is an auxiliary power unit.

4. The method of claim 1, including maintaining the speed of the turbomachine using a motor.

5. The method of claim 1, including maintaining the light-off speed during the delivering.

6. A method of fuel delivery to a turbomachine, comprising:
   reaching a light-off speed of a turbomachine;
   delivering fuel to a combustor of the turbomachine at a first rate;
   increasing a rate of the delivering, wherein the combustor achieves light-off at a fuel flow rate on or in-between the first rate and a second rate that is greater than the first rate, wherein the first rate corresponds to a lowest fuel flow command that could produce a combustor light-off and the second rate corresponding to a highest fuel flow command that could produce a combustor light-off;
   adjusting fuel delivery components to provide fuel to the combustor at the first rate and then increasing the rate to achieve light-off without exceeding the second rate; and
   delivering for at least four seconds before increasing.

7. The method of claim 6, including delivering for at least four seconds at the second rate.

* * * * *